United States Patent [19]

Kabasin

[11] Patent Number: 5,253,475
[45] Date of Patent: Oct. 19, 1993

[54] COMBUSTION DETECTION

[75] Inventor: Daniel F. Kabasin, Rochester, N.Y.

[73] Assignee: General Motors Corporation, Detroit, Mich.

[21] Appl. No.: 902,249

[22] Filed: Jun. 22, 1992

[51] Int. Cl.$^5$ ............................ F01N 3/28; F23N 5/00
[52] U.S. Cl. ........................................ 60/274; 60/277; 60/284; 60/300; 431/66
[58] Field of Search ............... 60/274, 277, 284, 300, 60/303, 39.091; 123/644, 198 DB; 431/66, 69, 78

[56] References Cited

U.S. PATENT DOCUMENTS

| | | | |
|---|---|---|---|
| 2,628,676 | 2/1953 | Shottenfeld | 431/66 |
| 3,343,366 | 9/1967 | Siegler | 60/39.091 |
| 3,854,288 | 12/1974 | Heitland | 60/300 |
| 4,915,086 | 4/1990 | Ciliberto | 123/644 |

Primary Examiner—Douglas Hart
Attorney, Agent, or Firm—Howard N. Conkey

[57] ABSTRACT

A combustion detection method and apparatus for an automotive internal combustion engine exhaust burner having a spark means with spaced electrodes for burner ignition, wherein the voltage drop across the spaced electrodes is compared to a predetermined voltage level, and combustion is assumed to be present if the voltage drop does not exceed the predetermined voltage level for a predetermined number of ignition events, and combustion is assumed to not be present if the voltage drop exceeds the predetermined voltage level for a predetermined number of ignition events.

8 Claims, 5 Drawing Sheets

COMBUSTION DETECTION

FIELD OF THE INVENTION

This invention relates to internal combustion engine emission control and, in particular, to flame detection in catalytic converter preheaters.

BACKGROUND OF THE INVENTION

It is generally known that undesirable emissions of internal combustion engines may be significantly reduced by passing the exhaust gas thereof through catalytic converters. When conventional converters are at light-off temperatures, such as 350 degrees Celsius, exothermic reactions occur therein, resulting in efficient reduction of engine emissions. Converter temperature may be elevated to light-off temperature from latent exhaust gas heat. On cold start, a converter heated with latent exhaust gas heat may, under normal engine warm-up conditions, require 75 seconds or more to reach its light-off temperature.

Additional heat sources have been proposed for more rapid heating of the converter, so that efficient conversion of undesirable exhaust gas constituents may begin earlier in the operating cycle. For instance, electrically heated converters have been proposed, in which electrical energy is selectively applied to a device that converts that electrical energy to thermal energy, which is made available to the converter. The efficiency of such heating systems requires that substantial electrical energy be expended before any significant emission reductions may be achieved.

Alternatively, burner systems have been proposed for rapid heating of the converter. Such systems attempt to ignite an air/fuel mixture at a point slightly upstream of the converter, whereby the released combustion energy operates to rapidly increase the converter temperature. The combustion of the air/fuel mixture in such systems may be provided for and maintained by a periodic spark in proximity to the air/fuel mixture, such as from a conventional spark plug driven by a periodic energization signal from a controller.

In a first mode of operation, burner systems typically attempt to initiate combustion in the burner as rapidly as possible. A substantially rich air/fuel mixture is provided to the burner in proximity to a periodic spark. Once combustion is present, a second mode of operation is entered, in which the air/fuel mixture may be enleaned consistent with a compromise between the competing goals of rapid heating of the converter and favorable emissions from the burner-converter combination. To enter the second mode of operation as soon as combustion is taking place in the converter will contribute to these goals. Accordingly, what is needed is a system for rapidly detecting combustion in the burner and for indicating the presence of such combustion.

Furthermore, in the second mode of operation, it is desirable to monitor the combustion process, to ensure that in the event burner combustion is extinguished, the supply of fuel is stopped. Otherwise, a substantial quantity of unburnt fuel may be passed through to a catalytic converter that is not yet at light-off temperature, resulting in increased levels of undesirable emissions to the atmosphere. Accordingly, what is also needed is a system for continuously monitoring combustion activity in the burner, and for rapidly indicating an absence of combustion therein.

SUMMARY OF THE INVENTION

Accordingly, it is an object of the present invention to provide a method and apparatus for sensing the status of combustion in a burner system, such as a catalytic converter preheater.

Another object of this invention is to provide such information to a burner controller expeditiously, so that appropriate burner control adjustments may be made.

Yet another object of this invention is to carry out the sensing object and the supplying object without significantly affecting the cost or complexity of the burner system.

Such objects are provided in a burner system with a high voltage spark plug drive line, by surrounding a portion of the drive line with a sense coil, and by monitoring the induced potential across the sense coil. In the absence of flame, there is a voltage spike induced across the sense coil a period of time after the spark plug excitation pulse passes through the spark plug drive line. The spike is of sufficient magnitude such that it may be distinguished from other activity picked up by the sense coil, simply by comparing the induced voltage across the sense coil to a predetermined reference voltage. When the induced voltage exceeds the reference voltage, it is assumed that no combustion is present in the burner.

BRIEF DESCRIPTION OF THE DRAWINGS

The invention may be best understood by reference to the following description of a preferred embodiment and to the drawings in which.

DESCRIPTION OF THE PREFERRED EMBODIMENT

Figure 1:
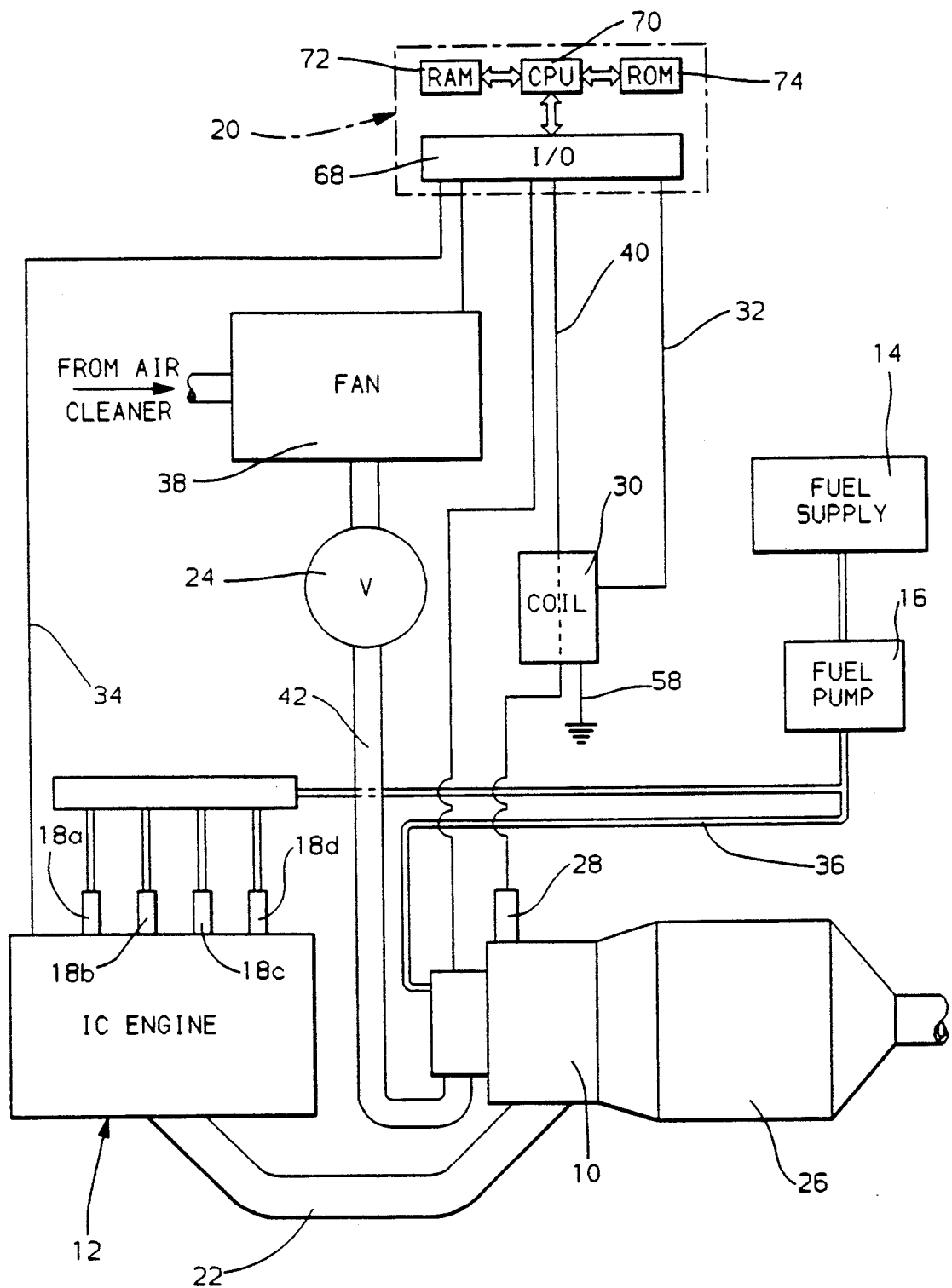
FIG. 1 is a general diagram of the catalytic converter burner system in which combustion detection in accord with this invention may be used.

Referring to FIG. 1, a burner assembly 10 is disposed in the exhaust system of an internal combustion engine 12. The engine 12 is supplied with fuel from a fuel system comprising fuel supply 14, such as a fuel tank and fuel pump 16 which delivers pressurized fuel to fuel injectors 18a–18d. A conventional engine controller (not shown) monitors engine parameters through sensors (not shown) and varies fuel, air and spark accordingly. Exhaust gas exits engine 12 through exhaust conduit 22 and enters burner assembly 10. The burner assembly is operably connected with catalytic converter 26 through which the exhaust gas passes after exiting burner assembly 10.

Combustion air is supplied to the burner assembly 10 via an engine driven or electrical air pump or fan 38 via conduit 42. The air pump or fan receives fresh air passed through an air cleaner (not shown). The pump or fan 38 is controlled by a burner control module BCM 20, so that a proper quantity of air is administered to the burner assembly 10 at appropriate times. The air from the pump or fan 38 passes through a backflow control valve 24 before reaching the burner assembly 10. The backflow control valve 24 may be a conventional butterfly valve arrangement, which only allows flow therethrough when air pressure upstream of the valve is higher than air pressure downstream of the valve, for instance when pump or fan 38 is operating to propagate air into the burner. The backflow control valve 24 thus substantially prevents exhaust gas from contaminating the pump or fan 38, and from polluting any fresh air charge into the engine 12.

BCM 20 may be any conventional controller including input/output ports I/O 68, a central processing unit 70, random access memory RAM 72 and read only memory ROM 74. The I/O is a series of input ports where data may be freely exchanged between the ports and corresponding memory registers in a variety of formats depending on the configuration of the port. The CPU 70 may be any conventional microprocessing unit, such as a Motorola 6801 eight-bit, single chip microprocessor. Circuitry used in accord with this invention, illustrated in FIGS. 2 and 3, is included in the BCM 20, such as by attaching the circuitry to a conventional circuit board (not shown) and attaching the board to the BCM 20.

Fuel is supplied to the burner assembly 10 from the fuel system via conduit 36. A conventional fuel injector (not shown) disposed in the burner assembly 10 receives the fuel from the fuel line 36, and meters the fuel into the burner assembly in amounts and at times directed by the BCM 20. A conventional spark plug 28 is used to ignite an air/fuel mixture in the burner assembly 10, and is excited in a well-known manner via spark plug excitation line 40. A sense coil 30, of approximately 200 turns, such as a Wabash Magnetics solenoid, part no. 5234214, surrounds the excitation line 40 in such a manner that changes in current through the excitation line 40 will, according to well-established principles of electromagnetic field theory, induce current through coil 30, and thus will induce potential across the coil, which may be monitored by sensing the potential across the coil, for instance the potential between coil tap 32 and electrical ground from line 58.

Figure 2:
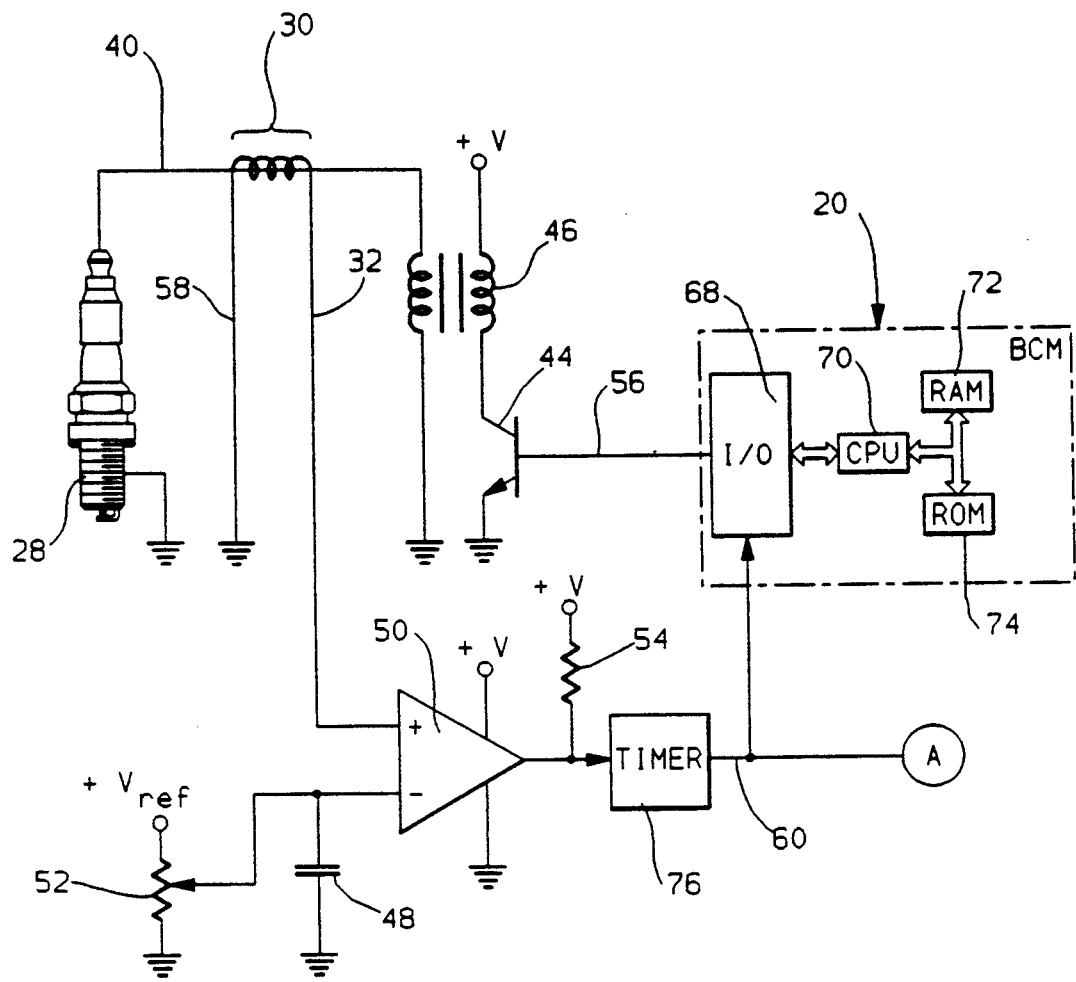
FIG. 2 is a combustion detection circuit in accord with a first and second embodiment of this invention.
Figure 3:
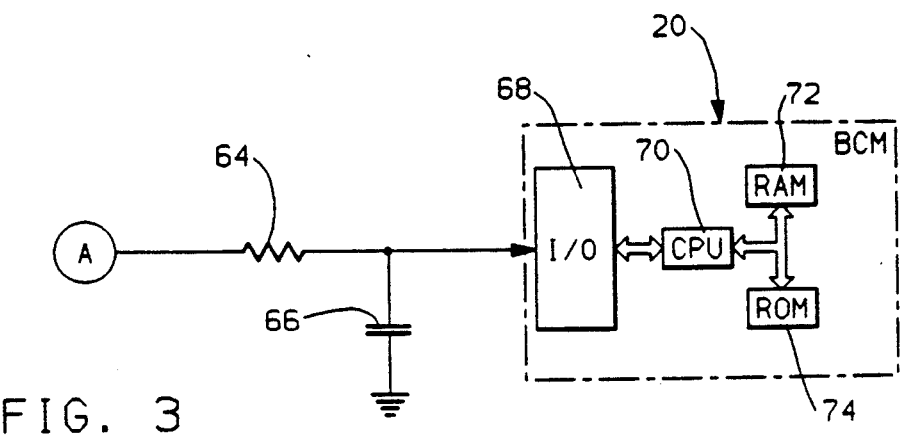
FIG. 3 is a additional combustion detection circuitry used in accord with a third embodiment of this invention.

The circuit used to carry out this sensing of the potential across the coil 30 in accord with a first and preferred embodiment of this invention is illustrated in FIG. 2. The circuitry may be packaged in any suitable manner via conventional packaging practice, such as by attaching the circuitry to a circuit board appended to the BCM 20, as described. Of course, as illustrated in FIG. 1, the spark plug 28 is attached to the burner assembly 10, and the coil 30 is disposed around the spark plug excitation line 40.

In a well-known manner, spark plug 28 is used to provide a periodic spark in the burner assembly 10 (FIG. 1) via the discharge of conventional step-up transformer 46. While output line 56 of the burner control module is high, transistor 44 is conducting, and transformer 46 is charging from the supply voltage. When the transformer is sufficiently charged and the spark plug 28 is to be fired, BCM 20 sets line 56 low, discharging transformer 46 in a well-known manner, forcing a surge of current through line 40, which arcs across the cathode-to-anode gap in spark plug 28. When it is desired to ignite the burner, air is provided thereto via conduit 42, and fuel via line 36 in such a manner that a series of such arcs across spark plug 28 may ignite the mixture.

To maintain such combustion, for instance while it is considered desirable and necessary to provide supplemental catalytic converter heating, fuel and air are continuously metered to the burner assembly 10, and a periodic spark signal is provided. In this embodiment, the spark is provided at approximately 64 Hertz, by setting output line 56 high for a short dwell time, such as 4 milliseconds, and then setting it low, once every 15.625 milliseconds.

In a critical aspect of this invention, the surge of current through line 40 induces a transient current through coil 30, from the high side of the coil, connected to line 32, to the low side of the coil, connected to line 58. The resultant voltage potential across the coil 30 is communicated to conventional comparator 50.

The comparator 50 may be a common operational amplifier, such as a National Semiconductor LM 2901 configured with the input voltage on the non-inverting input and a reference voltage on the inverting input. In a well-known manner, the comparator provides a positive output signal, which is ultimately provided to the burner control module BCM 20, when the voltage across the coil 30, as provided by line 32 to the non-inverting input of the comparator 50, exceeds the reference voltage on the inverting input of the comparator.

The reference voltage is selected so as to distinguish a transient voltage across coil 30 in the presence of combustion in burner assembly 10 from a transient voltage across coil 30 in the absence of combustion in burner assembly. FIG. 6 is a timing diagram illustrating general transient voltage waveforms across the coil in the presence and in the absence of combustion in the burner assembly 10. The signals of FIG. 6 preceding time $t_f$ are intended to generally illustrate the signals observed in the absence of combustion in the burner assembly 10, and the signals after time $t_f$ generally illustrate signals observed in the presence of combustion in the burner assembly.

Figure 6A:
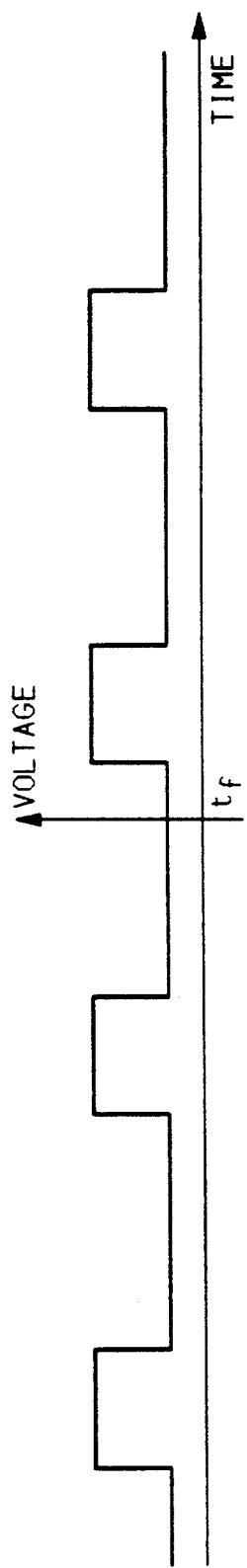
FIG. 6 is a timing diagram illustrating the time relationship between various signals of the circuit of FIG. 2.
Figure 6B:
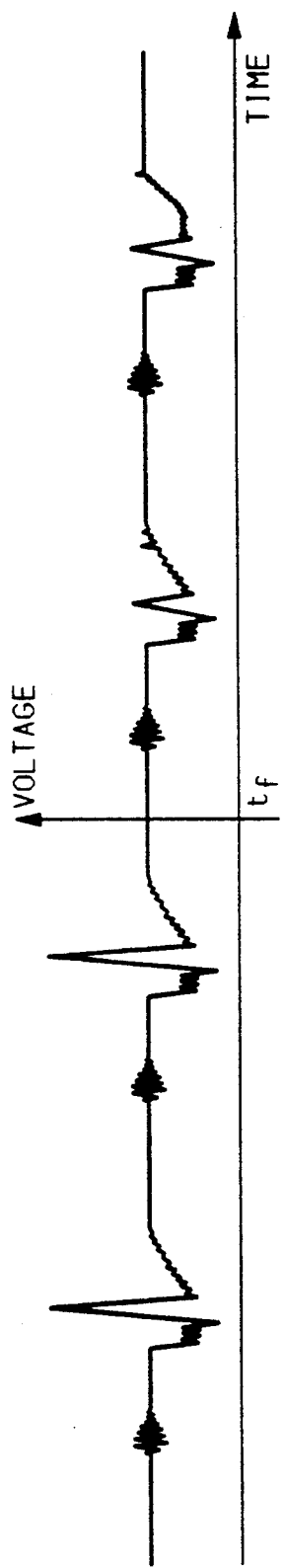
Figure 6C:
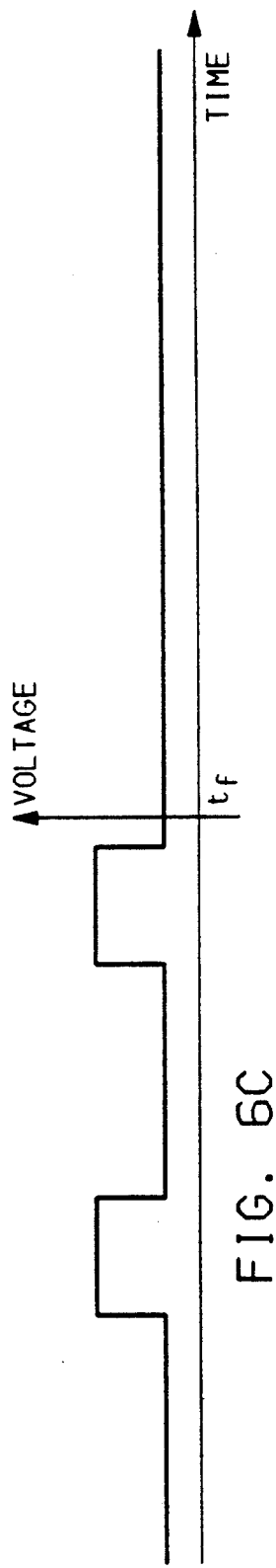

Specifically, FIG. 6a shows the signal applied to transistor 44 via BCM output line 56, to discharge the transformer 46, as described. FIG. 6b illustrates the transient voltage sensed across coil 30 when the corresponding signal of FIG. 6a is applied to transistor 44. In a critical aspect of this invention, the voltage transient across the coil 30 in the absence of combustion in burner assembly 10 includes a high amplitude spike, which is a short duration, high amplitude signal excursion., illustrated as the signal in FIG. 6b that precedes time $t_f$. Although a similar excursion may be observed in the presence of combustion in burner assembly 10, the amplitude of the spike will be substantially lower, as generally illustrated in FIG. 6b as the signal after time $t_f$. FIG. 6c generally illustrates a signal that has discriminated the presence f flame in the burner assembly 10, wherein a pulse is provided only when the high voltage spike has been detected.

Generally, when combustion is taking place in a burner assembly for a catalytic converter, such as that illustrated in FIG. 1, a portion of the flame will be in close proximity to the gap (the air between the cathode and anode) of spark plug 28. This flame creates a well-known ionization effect, wherein additional current carrying ions are provided across the gap, reducing the resistance across the gap. As a result, the voltage build-up (and discharge) across the gap will not be as great before the arc or spark occurs. Accordingly, the current surge through line 40 will be reduced with the presence of flame in proximity to the gap, and the transient voltage induced across coil 30 will be generally of lower magnitude. Therefore, by distinguishing the relatively large voltage spike across coil 30 in the absence of flame from the smaller voltage spike observed when flame is present, the presence of combustion may be detected.

Figure 4:
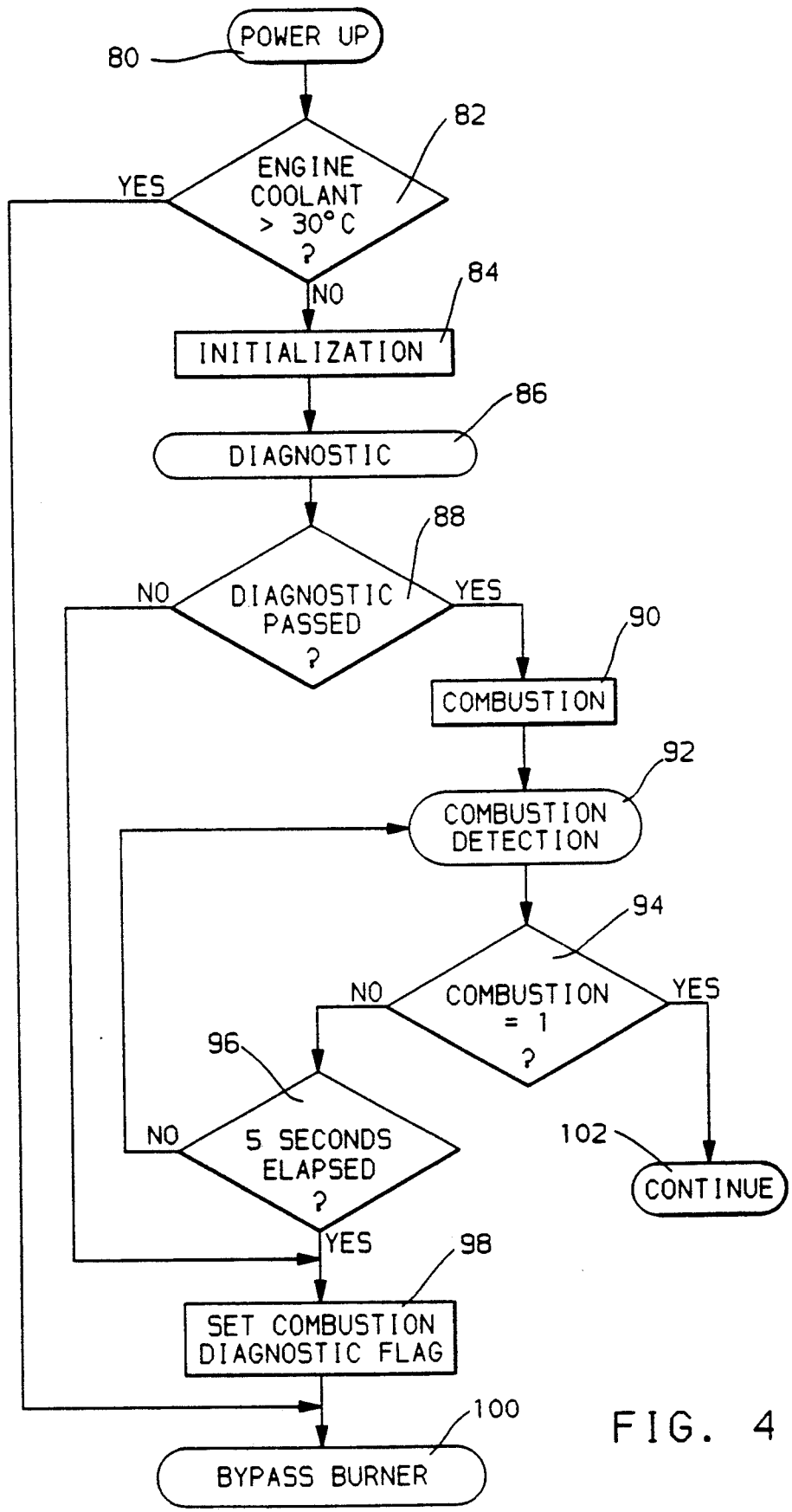
FIGS. 4 and 5 are computer flow diagrams illustrating the steps used to carry out the invention in accord with first embodiment.
Figure 5:
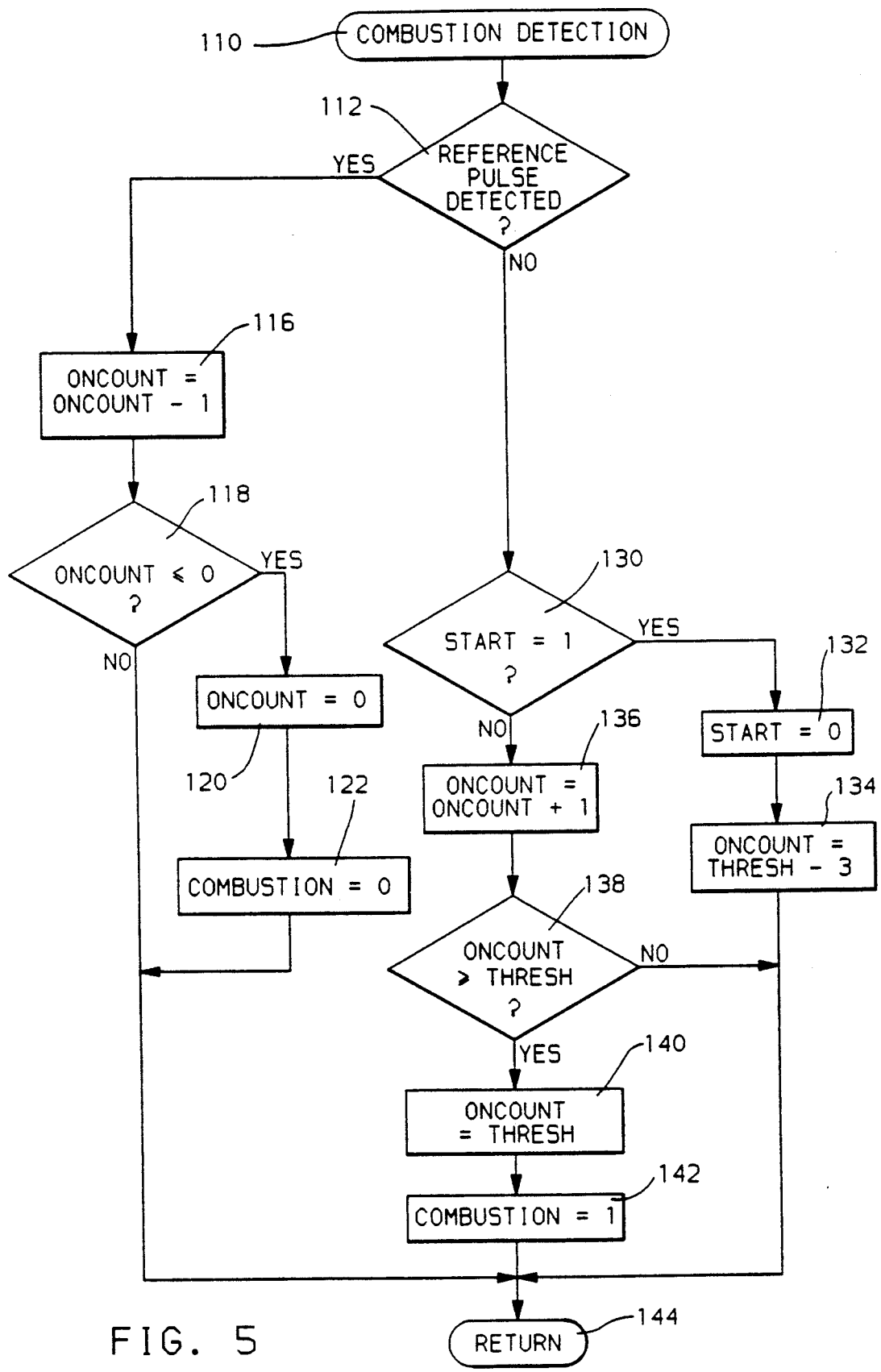

In a first embodiment of this invention, the circuit of FIG. 2 together with the computer flow diagrams of FIGS. 4 and 5, are used to identify voltage spikes in the absence of combustion. A second embodiment is described for combustion detection in accord with this invention, that also operates with the circuit of FIG. 2. Additionally, a third embodiment is disclosed using the circuit of FIG. 2 with a modification illustrated in FIG. 3. This third embodiment may use a computer flow diagram similar to that of FIG. 5. The inventor does not intend that this invention be in any way limited to the three specific embodiments illustrated herein, as any method or apparatus that distinguishes the induced voltage across coil 30 in the presence of flame from the voltage induced across coil 30 in the absence of flame is within the scope of this invention.

Returning to FIG. 2, the comparator reference voltage applied to the inverting operational amplifier input terminal may be selected as a voltage between the peak voltage of the high amplitude spike illustrated in FIG. 6b before time $t_f$, and the peak voltage of the low amplitude spike from the portion of FIG. 6b after time $t_f$. In this embodiment, the voltage is selected as 3 volts by adjusting conventional variable resistor 52 so the voltage drop from the inverting input terminal of the operational amplifier 50 to ground is approximately 3 volts. Additionally, a conventional bypass capacitor, such as a 100 microfarad electrolytic capacitor may be provided in this embodiment from the inverting terminal of the comparator 50 to ground, to filter high frequency noise, which otherwise may pollute the reference voltage and interfere with the precision of the comparator 50.

As discussed, the comparator output line will be high when the voltage across the coil exceeds the comparator reference voltage. The output is pulled up to 5 volts via pull-up resistor 54, which may be three kilo-ohms. The pulled up comparator output is passed to a timer circuit 76 for signal conditioning purposes. The timer 76, which is a National Semiconductor LM322 in the preferred embodiment, is triggered by a comparator output signal above a predetermined threshold voltage, such as 17 volts. Once triggered, the timer output line is set high for a period of time related to a user selectable time constant. The time constant is selected by connecting a resistor-capacitor pair to the timer in a manner fully described in the National Semiconductor product sheets for the LM322.

For this embodiment, a 16 kiloohm resistor and a 0.22 microfarad capacitor are used. Such values provide that, once triggered, the time 76 will hold its output line high for approximately four milliseconds. The timer output signal is conditioned to provide a high signal of approximately five volts in this embodiment, and a low signal of approximately zero volts.

In the preferred embodiment, the timer output line 60 is connected to a conventional counter input port which, in a manner well-known in the art of processor control, may be configured to count input events on line 60, such as rising or falling edges, or levels, and to automatically store the current event count in the corresponding RAM register. The condition of the signal being received at the timer/counter input of the BCM 20 is generally illustrated in FIG. 6c. In the portion of the signal of FIG. 6c preceding time $t_f$, pulses are seen as a result of a lack of flame in proximity to the spark plug gap, whereas after time $t_f$, no pulses are seen as flame is present in proximity to the spark plug gap, as described. As described, the comparator 50 generally distinguishes between the large and small voltage spikes using the calibrated reference voltage at its inverting terminal. The timer 76 then conditions the signal and, once triggered by a high output from the comparator, holds the signal high for approximately four milliseconds.

FIGS. 4 and 5 illustrate computer flow diagrams in accord with the preferred embodiment of this invention. Software code may be used to carry out the specific steps in accord with the embodiments of this invention, wherein the CPU 70 may read and execute a series of instructions stored in ROM 74. On power-up, such as when the vehicle operator rotates the vehicle key to its "on" position, in addition to the start-up of any other vehicle controllers, the burner control module CPU 70, will branch to burner control routines, such as that illustrated in FIG. 4, starting at step 80. The routine then will proceed to step 82 to check engine coolant temperature.

Coolant temperature is used at step 82 as a means of estimating the temperature of the catalytic converter 26. For instance, if the converter is estimated to be exothermically active, such as when it is at its light-off temperature, any supplemental heating provided by the burner in accord with this embodiment may be assumed to be unnecessary to reduce the time to light-off, and the routines in accord with the embodiments of this invention may be bypassed. The inventor intends that other means of converter temperature or converter activity measurement may be substituted at this step, such as with a conventional thermocouple disposed in the converter. The output of the thermocouple may be used as an absolute measure of converter temperature, or may be compared to the temperature of the exhaust upstream of the converter, as a measure of the level of exothermic activity in the converter.

In this embodiment, the engine coolant temperature above which burner heating is bypassed is calibrated to be 30 degrees Celsius. Accordingly, at step 82, if coolant temperature is above 30 degrees, the routine of FIG. 4 proceeds to step 100, to bypass any attempt to ignite the burner for supplemental catalytic converter heating, such as by stopping operation of the burner control module 20 until such time as additional converter heating is needed.

Alternatively, if coolant temperature is below 30 degrees Celsius, the routine proceeds to step 84, for general burner control module BCM 20 initialization. For example, at this step data constants may be loaded into RAM 72 from ROM 74, and pointers, flags, and counters may be initialized, according to the needs of the routines to be executed by the BCM 20. For instance, a number of variables to be used in the embodiments of this invention are set to initial values at this step. These include the random access memory variables COUNTER, COMBUSTION, and ONCOUNT, which are set to zero at step 84, and START, which is set to one.

Next, the routine moves to step 86, to carry out a general diagnostic routine in accord with an embodiment of this invention. Any method or apparatus for verifying that the hardware used in accord with this invention is substantially fault-free may be used at this step. For example, by providing spark to the burner while not providing air or fuel to the burner, the high amplitude spikes illustrated in the portion of FIG. 6b preceding time t_f should be present across the coil 30. If no spike is sensed, the diagnostic may be assumed to have identified a hardware fault. Additionally, if spark is not provided to the plug 28, no spikes should be sensed across the coil 30. Any sensed spike would then indicate a fault condition. In either of these examples of diagnostic routines that may be used at step 86, if a potential fault is identified, the routine advances to step 98, to set a failure flag in BCM memory, such as non-volatile random access memory, for future diagnostic or maintenance use.

The routine then moves to step 100, to disable any further burner operation, such as by interrupting any further delivery of fuel, air, or spark to the burner assembly 10. Only upon another power-up of the vehicle burner control module BCM 20 would further burner operation then be possible. However, if, at step 88, the diagnostic does not identify any potential faults in the hardware of FIG. 2 (or FIG. 3 in the third embodiment), the routine proceeds to carry out the burner control in accord with this embodiment.

Specifically, the routine proceeds to step 90, to set the appropriate conditions in burner assembly 10 for combustion, including providing a desirable air/fuel mixture into the burner via control of the pump or fan 38, and control of the fuel injector (not shown), and causing the spark plug 28 to spark at 64 Hertz, as discussed. Such conditions should normally ignite the burner within at most 5 seconds. Accordingly, the routine of FIG. 4 will allow approximately 5 seconds for the start of combustion from the time combustion is first attempted at step 90. Specifically, the routine of FIG. 4 proceeds to step 92 to execute a combustion detection routine in accord with this invention, such as the routine of FIG. 5. If the routine executed at step 92 determines that combustion is taking place in the burner assembly 10, it will assign the value '1' to RAM variable COMBUSTION. If no combustion was found, COMBUSTION will be set to zero.

Next, the routine advances to step 94, to determine the most recent value assigned to RAM variable COMBUSTION by the routine called at step 92. If COMBUSTION was set to 1, the routine proceeds to step 102, where it may continue on to execute any steps necessary to control the ignited burner, such as by metering both air and fuel to the burner until such time that the catalytic converter has heated up to a satisfactory temperature, such as its light-off temperature. The inventors intend that any means of controlling the burner assembly 10 is sufficient at this step, such as any conventional burner control approach. During the time that additional control of the burner assembly 10 is provided, such as for supplemental catalytic converter heating, the combustion detection routine may be repeatedly executed for an indication of whether combustion is taking place. In the event that any such execution of a combustion detection routine detects a lack of combustion in burner assembly 10, the supply of fuel, air, and spark may be interrupted to the burner assembly, so as to prevent a substantially unburnt air/fuel mixture from being passed to the converter, especially a converter that is not exothermically active, as otherwise increased levels of undesirable emissions would likely be released to the atmosphere.

Returning to step 94, if COMBUSTION was set to 0, the routine proceeds to step 96 to determine if 5 seconds have elapsed since the first check for burner combustion at step 92. If 5 seconds or more have elapsed, the lack of combustion in burner assembly 10 is assumed to be the result of a faulty burner, and the routine proceeds to step 98 to set a burner diagnostic flag in controller memory, to provide a record of the combustion failure for future diagnostic or maintenance purposes. The routine then proceeds to step 100, to bypass any further burner operations until the next start-up of the engine, as discussed. Alternatively a step 96, if 5 seconds have not elapsed, the routine returns to step 92 to again call the combustion detection routine. As will be described, it may be desirable to only execute the combustion detection routine at a specific frequency, for instance when new information becomes available on combustion. Such timing of the frequency of execution of the combustion detection routine may be provided by interposing a predetermined delay routine (not shown) between step 96 and step 92 of the routine of FIG. 4, such as approximately 15 milliseconds.

The specific operation of a first embodiment of the combustion detection routine, as called from step 92 of the routine of FIG. 4 and in accord with this invention, is illustrated in FIG. 5, and is entered at step 110. This routine should be executed at a rate not slower than the rate at which pulses are sent to transistor 44, via spark plug drive line 56, so that combustion detection may take place at least once for every spark plug drive pulse delivered to line 56. For instance, in this embodiment, pulses are issued on spark plug drive line 56 approximately every 15.625 milliseconds, such that the routine of FIG. 5 should be executed at least once every 15.625 milliseconds. Again, a simple delay routine interposed between steps 96 and 92 of FIG. 4 would be sufficient for such timing.

After entering the routine of FIG. 5 at step 110, the routine proceeds to step 112, to read the counter register in RAM 72, to determine if any pulses from line 60 were counted since the last execution of this step. As described, a pulse signal will be output by conventional timer circuit 76, and thus counted by the counter input of the BCM 20 when the amplitude of the voltage across the coil 30 (FIG. 2) exceeds the reference voltage of comparator 50. Proper calibration of the reference voltage will provide that the comparator 50 will only trigger the timer 76 to output a pulse when spark is being provided to the burner 10 without combustion, as described. It may be desirable to configure the counter register to automatically be reset to zero, if necessary, after it is read, such as at step 112. Such configuration is well-known in the art of microprocessor development and may be provided during initialization, such as at step 84 of the routine of FIG. 4. Otherwise, the counter register should be cleared manually after reading it at step 112.

Returning to step 112, if a pulse has been counted, as evidenced by a 1 stored in the counter register, the routine proceeds to step 116, to decrement ONCOUNT. ONCOUNT is incremented when no pulse is detected (counted) on controller input line 60, and is decremented when a pulse is detected, as a way to monitor activity on the input line.

Next, the routine moves to step 118 to compare ONCOUNT with the value zero. If ONCOUNT has been decremented to zero, or to a value less than zero, a sufficient number of pulses have been received such that it may be assumed that no combustion is taking place in the burner assembly 10. Accordingly, it is limited to zero at step 120, and a flag COMBUSTION is cleared to zero at step 122, indicating that despite any efforts at combustion in burner assembly 10, no such combustion is currently taking place. The flag will be used later in the general burner control algorithm, such as steps 96-100 in FIG. 4, as a condition for further delivery of air, fuel and spark to burner assembly 10. Next, or if ONCOUNT was not at or below 0 at step 118, the routine proceeds to step 144, to return to step 92 of the routine of FIG. 4.

Returning to step 112, if a pulse is not detected at the controller input port from input line 60, the routine proceeds to step 130, to determine whether flag START is set to 1. START, if set to 1, indicates the first iteration of the routine of FIG. 5 in which a pulse was not detected, and is needed in this embodiment to initialize ONCOUNT. Accordingly, if START is 1 at step 130, the routine proceeds to step 132, to clear START, and then moves to step 134, to initialize ONCOUNT to the value THRESH—3. The value THRESH is a calibrated constant stored in ROM 74 and set as the threshold value ONCOUNT must reach before it will be assumed that combustion is present in burner assembly 10. In this embodiment, THRESH is set to 100, indicating that, once flame is determined to be present in burner assembly 10, 100 successive iterations of the routine of FIG. 5 must read a pulse in the counter register before the flame will be assumed to have been extinguished.

In initializing ONCOUNT to the value THRESH-3, step 134 provides that once there is no pulse on line 60 (FIG. 2) following an ignition pulse on line 56 (FIG. 2), ONCOUNT will be set so that it will not reach the threshold THRESH unless no pulse is detected for the next three iterations of the routine of FIG. 5. Furthermore, for every pulse detected on line 60, ONCOUNT will move one count further away from the threshold THRESH. Combustion will not be assumed to be present unless ONCOUNT reaches the threshold value THRESH.

This approach to recording the activity on line 60 thus generally recognizes the accuracy of the combustion detection method and apparatus of this invention by requiring only four successive iterations without a pulse to establish the presence of combustion. However, once combustion has been detected, this embodiment also recognizes the potential for occasional noise on line 60 that may be misinterpreted as indicating a lack of combustion, by not acting on any pulses received from input line 60 until a substantial number of such pulses have been received so that ONCOUNT has been decremented from THRESH to zero, as described.

After initializing ONCOUNT at step 134, the routine moves to step 144, to return to step 92 of FIG. 4. Returning to step 130, if the present iteration of the routine of FIG. 5 is not the first (since power-up at step 80 of FIG. 4) in which no pulse was detected, as evidenced by START not being set to 1, the routine advances to step 136 to increment ONCOUNT. Next, the routine moves to step 138 to compare ONCOUNT to threshold value THRESH which, as discussed, is a calibrated constant which is set to 100 in this embodiment. If ONCOUNT exceeds or is equal to THRESH at step 138, the routine moves to step 140, to limit ONCOUNT to THRESH, and then advances to step 142, to set COMBUSTION to 1, indicating generally that combustion is determined to be present in burner assembly 10. Next, or if ONCOUNT is less than THRESH at step 138, the routine proceeds to step 144, to return to step 92 of the routine of FIG. 4.

In a second embodiment of this invention, the combustion detection routine called from step 92 of the routine of FIG. 4 may include a general routine to monitor the actual time between edges of successive pulses received on the BCM input port from line 60 (FIG. 2). The port should be configured in a conventional manner as an event timer, triggered by rising or falling edges of any pulses output by the timer 76 on line 60. For example, in this embodiment, the timer is configured to store the number of CPU clock counts between falling edges of any pulses received at the timer port of the BCM 20 from timer output line 60. Upon receiving a falling edge from line 60, the CPU clock is read and the stored timer value in the timer register is subtracted therefrom to arrive at the elapsed time between the two most recent falling edges. The present CPU clock value is then stored in the timer register for the next determination of elapsed time.

Such event timing is well-known in the art of processor control. The calculated elapsed time may be read by a simple software routine up until a new value is stored in the register. An amount of elapsed time substantially exceeding the time rate of the spark plug drive pulses issued on drive line 56 (FIG. 2) would indicate the presence of combustion in burner assembly 10, such that COMBUSTION may then be set to 1. Furthermore, an amount of time substantially less than the time rate of two consecutive drive pulses may be interpreted as noise and not used in the combustion determination. Finally, an amount of time substantially the same as the time between consecutive drive pulses may indicate a lack of combustion in burner assembly 10, such that the flag COMBUSTION may be cleared. As described in the first embodiment, COMBUSTION is then used as a condition for further burner operation.

A third embodiment of this invention includes integrating means in series with output line 60, such as the integrating means illustrated in FIG. 3, inserted at point A of FIG. 2. The resistor-capacitor pair illustrated in a well-known integrator configuration in FIG. 3 is used in this second embodiment to extend the duration of any output pulse on line 60 (FIG. 2), to facilitate the monitoring of the output pulse by the BCM 20. As illustrated in FIGS. 6a-6c, pulses on line 60 only occur shortly after the issuance of spark plug drive pulses on line 50 (FIG. 6a) and before any subsequent spark plug drive pulses. Accordingly, in this embodiment, any pulse on line 60 is extended by the integrator a sufficient amount of time that it may be read up until issuance of the next spark plug drive pulse on line 50. The integrator output is then provided to a simple input port on the BCM 20 which is accessible via a software read of the port address.

In the preferred case where the drive pulses are approximately 15.6 milliseconds apart, such extension may be provided by selecting resistor 64 (FIG. 3) as 1300 ohms, and capacitor 66 as 6 microfarads. A routine then to detect combustion using the additional hardware of FIG. 3 together with that of FIG. 2 need simply monitor the output port of the BCM when the ignition is not in dwell time, which is when line 56 (FIG. 2) is low. This may be provided by simply substituting a step to read the RAM register corresponding to the input port when output line 56 (FIG. 2) is low, for step 112 of FIG.

5. If the register is set to 1 and the ignition is not in dwell time, the routine could proceed to the described steps 116 through 144 of FIG. 5, in the manner described in the first embodiment. Alternatively, if the port is at 0 and the ignition is not in dwell time, the routine could proceed to steps 130 through 142 of FIG. 5, as discussed in the first embodiment. Thus, combustion detection may be provided without any special configuration of an input port of the BCM.

The above-described preferred and alternative embodiments for the purposes of explaining the principles of this invention are not to be considered as limiting or restricting the invention since many changes may be made to the embodiments through the exercise of skill in the art without departing from the invention.

The embodiments of the invention in which a property or privilege is claimed are as follows:

1. An apparatus for detecting the presence of flame in a burner for an automotive catalytic converter, the burner having spark means with spaced electrodes, a supply of air and fuel, and energizing voltage providing means for providing an energizing voltage across the spaced electrodes of the spark means at a level to induce a current between the spaced electrodes, comprising:

estimating means for estimating the level of the energizing voltage provided across the spaced electrodes of the spark means;

means for comparing the estimated level of the energizing voltage to a predetermined reference voltage; and flame detecting means for detecting flame in the burner when the estimated level of the energizing voltage does not exceed the predetermined reference voltage.

2. The apparatus of claim 1, further comprising means for adjusting the supply of air and fuel to the burner when flame has been detected therein.

3. The apparatus of claim 1, wherein the flame detecting means detects flame in the burner when the estimated level of the energizing voltage does not exceed the predetermined reference voltage for a predetermined period of time.

4. The apparatus of claim 1, wherein the estimating means further comprises:

a coil of electrical current conducting means disposed around a predetermined portion of the energizing voltage providing means;

monitoring means for monitoring the voltage across the coil for a predetermined period of time including the period of time in which current is induced between the spaced electrodes of the spark means as an estimate of the level of the energizing voltage-provided across the spaced electrodes of the spark means.

5. A method for detecting the presence of flame in a burner for an automotive catalytic converter, the burner having spark means with spaced electrodes, a supply of air and fuel, and energizing voltage providing means for providing an energizing voltage across the spaced electrodes of the spark means at a level to induce a current between the spaced electrodes, comprising the steps of:

estimating the level of the energizing voltage provided across the spaced electrodes of the spark means;

comparing the estimated level of the energizing voltage to a predetermined reference voltage; and detecting flame in the burner when the estimated level of the energizing voltage does not exceed the predetermined reference voltage.

6. The method of claim 5, further comprising the step of adjusting the supply of air and fuel to the burner when flame has been detected therein.

7. The method of claim 5, wherein the flame detecting step detects flame in the burner when the estimated level of the energizing voltage does not exceed the predetermined reference voltage for a predetermined period of time.

8. The method of claim 5, wherein the estimating step further comprises the steps of:

locating a coil of electrically conductive material around a predetermined portion of the energizing voltage providing means;

monitoring the voltage across the coil for a predetermined period of time including the period of time in which current is induced between the spaced electrodes of the spark means as an estimate of the level of the energizing voltage provided across the spaced electrodes of the spark means.

* * * * *